United States Patent [19]

Galbraith, Jr.

[11] 4,397,006

[45] Aug. 2, 1983

[54] CROSS TRACE COHERENT NOISE FILTERING FOR SEISMOGRAMS

[75] Inventor: James N. Galbraith, Jr., Dallas, Tex.

[73] Assignee: Mobil Oil Corporation, New York, N.Y.

[21] Appl. No.: 221,865

[22] Filed: Dec. 31, 1980

[51] Int. Cl.³ .............................................. G01V 1/36
[52] U.S. Cl. ...................................... 367/40; 367/42; 179/1 P; 73/602; 364/421
[58] Field of Search ................................... 367/40–43, 367/100; 179/1 P; 343/100 CL; 73/602; 364/724, 421

[56] References Cited

U.S. PATENT DOCUMENTS

| | | | |
|---|---|---|---|
| 3,629,800 | 12/1972 | Scheider | 367/45 |
| 3,705,382 | 12/1972 | Quay | 367/51 |
| 4,063,549 | 12/1977 | Beretsky et al. | 73/602 |
| 4,095,225 | 6/1978 | Erikmats | 367/100 |
| 4,204,279 | 5/1980 | Parroch et al. | 367/40 |
| 4,223,399 | 9/1980 | Hachett | 367/41 |
| 4,283,601 | 8/1981 | Nakagima et al. | 179/1 P |
| 4,323,876 | 4/1982 | Parroch et al. | 367/40 |

Primary Examiner—Nelson Moskowitz
Attorney, Agent, or Firm—C. A. Huggett; M. G. Gilman; J. F. Powers, Jr.

[57] ABSTRACT

In seismic exploration windows from a pair of contiguous traces are used in a process which determines the coherent noise on a basis trace and removes this coherent noise from a prediction trace. The operator of a digital filter is determined by autocorrelating the basis trace, cross-correlating the window of the basis trace, with the window of the prediction trace, and selecting the filter operator which produces the least error between the cross-correlation function and the product of the autocorrelation function and the operator.

3 Claims, 6 Drawing Figures

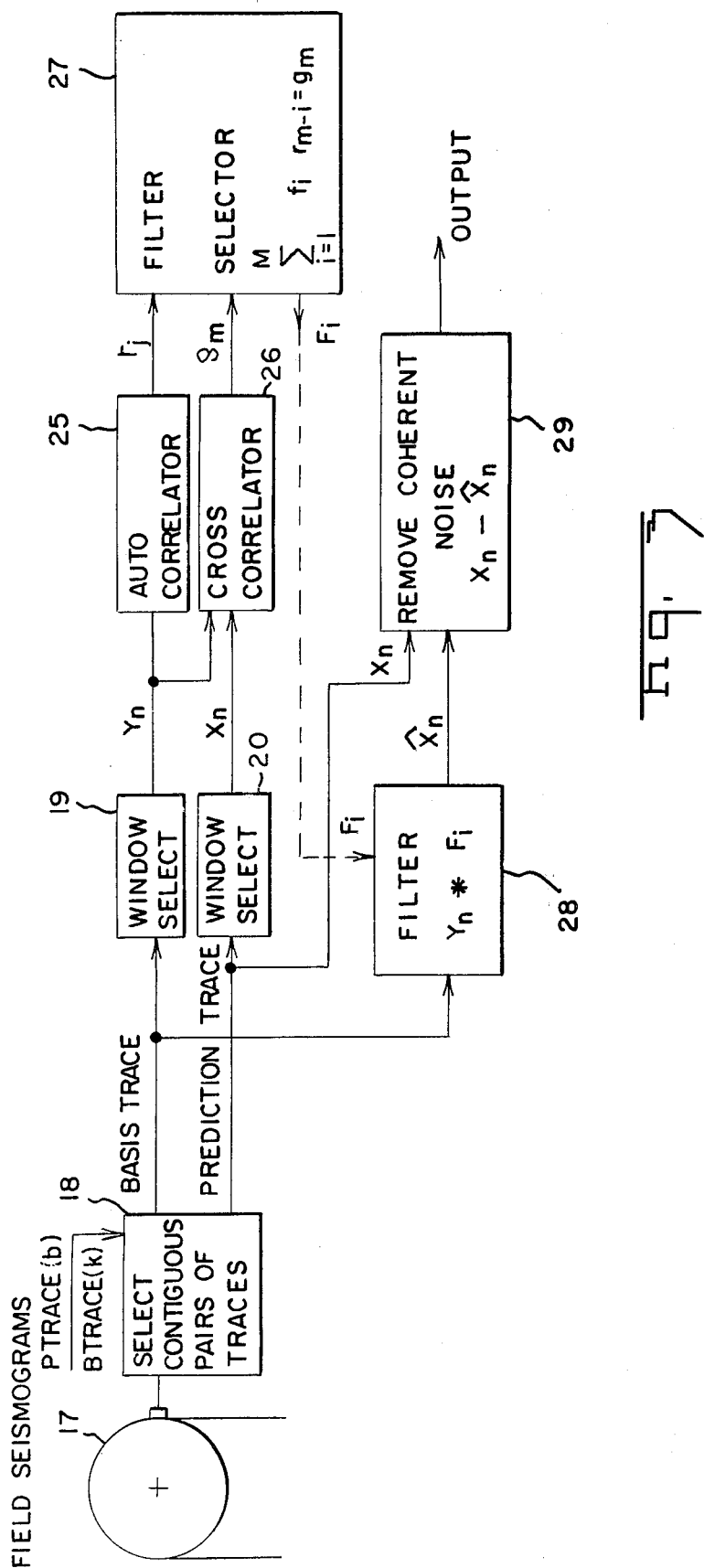

CROSS TRACE COHERENT NOISE FILTERING FOR SEISMOGRAMS

BACKGROUND OF THE INVENTION

This invention relates to seismic exploration and more particularly, to the deconvolution of seismic traces to remove noise and distortion.

In seismic exploration, it has become common to process the seismic traces obtained as a result of a seismic disturbance to remove some of the noise thereby rendering the seismic data easier to interpret.

The noise which is present in the seismic traces may include random, or incoherent, noise which is present by reason of the instruments used or the particular obscuring nature of the geophysical formations being surveyed.

There is another type of noise which is referred to as coherent noise. This noise includes what is commonly referred to as ghosts or multiple reflections from the reflecting interfaces. Other coherent noise includes noise trains and near surface refractions.

In seismic exploration, the field records include seismic traces from a plurality of detectors located along a line of exploration. When a source of seismic energy is energized, the detectors produce the field records representing the reflections of seismic energy from the subsurface interfaces. However, the traces also include the aforementioned coherent noise. As is well known, the reflections have a moveout from trace to trace which is dependent upon the offset between the seismic detectors and upon the velocity characteristics of the earth. The coherent noise has a different moveout than the reflections.

Examples of techniques which makes use of the different moveout between coherent noise and reflections to filter out the coherent noise as shown in U.S. Pat. Nos. 3,284,763—Burg et al. and 3,550,073—Foster et al.

Inverse filtering, or deconvolution, is an effective technique of removing coherent noise. Once the characteristics of the noise are determined, the operator of a time domain filter which will remove that noise is obtained. U.S. Pat. No. 3,689,874—Foster et al. is an example of deconvolution where the nature of the noise in a seismic trace is determined from the trace itself. An inverse filter then removes that noise from the trace. The present invention is an improvement on this type of process.

SUMMARY OF THE INVENTION

Two-trace deconvolution is carried out in accordance with the present invention wherein coherent noise in a sampling window of a basis trace is determined by filtering. The coherent noise signal is then removed from a prediction trace.

In carrying out the invention, sampling windows are selected from a pair of contiguous traces in a field record or a common depth point set. The sampling window of a basis trace is autocorrelated and this window is cross-correlated with a sampling window from the prediction trace. The autocorrelation and cross-correlation functions are used to determine the operator of a digital time domain filter. The basis trace is applied to this filter and the result is an estimate of the coherent noise. This coherent noise signal is removed from the prediction trace. The process is repeated for other contiguous pairs in a set to remove the coherent noise from all traces.

The present invention provides important advantages over prior art techniques of suppressing coherent noise such as multiple refractions. Typically this is done in the prior art by muting traces in the record time displaying these multiple refractions. The present invention removes coherent noise without seriously degrading reflection signals which may occur in the same record time.

The foregoing and other objects, features and advantages of the invention will be better understood from the following more detailed description and appended claims.

SHORT DESCRIPTION OF THE DRAWINGS

FIG. 3 depicts the present invention;

DESCRIPTION OF THE PREFERRED EMBODIMENT

Figure 1:
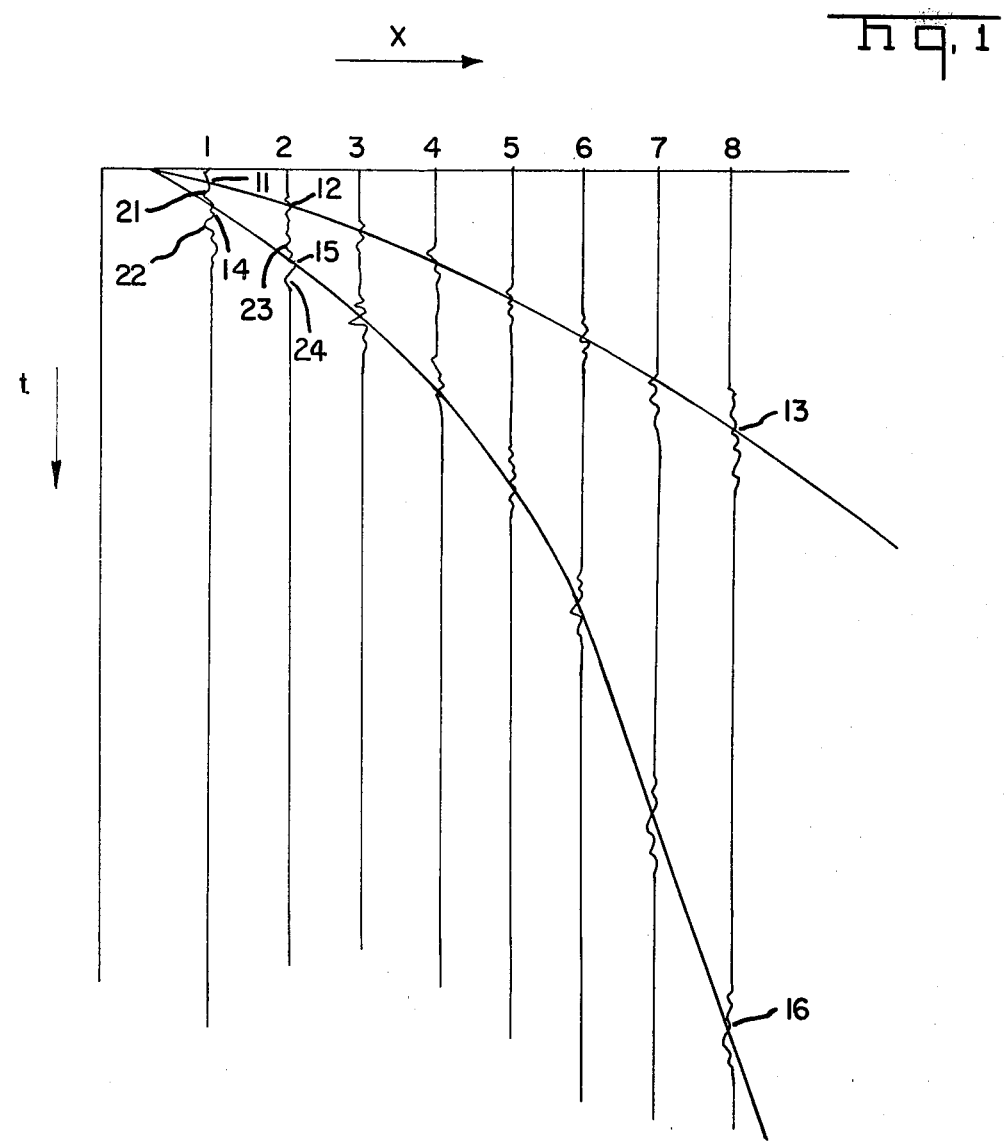
FIG. 1 depicts the traces in a field record.

FIG. 1 depicts seismic traces in a field record which is obtained when seismic energy from a common source is detected by a string of geophones spaced along a line of exploration. The present invention is best applied to field records which have a common source but it can also be applied to common depth point sets wherein traces from different shots are gathered in a manner so that they represent reflections from common depth points. In FIG. 1 the reflections from a subsurface interface are indicated at 11, 12 ... 13 on traces 1–8 respectively. As is well known, these reflections have a moveout from trace to trace which is approximately hyperbolic.

FIG. 1 also depicts a noise train which appears at 14, 15 ... 16 on traces 1–8 respectively. Coherent noise such as this has a different moveout than reflections. It is distinguished from reflection signals by having an apparent velocity which is different from the true velocity with which the seismic wave travels to an interface, is reflected, and travels to the detector. Quite often, the moveout from trace to trace for this coherent noise is known.

In accordance with the present invention pairs of contiguous traces are selected for deconvolution. For example, trace 1 is selected as the basis trace and trace 2 is selected as the prediction trace. These are designated BTRACE (k) and PTRACE (k) respectively. The index (k) designates the trace number, for example trace 1 and trace 2 respectively.

Figure 2A:
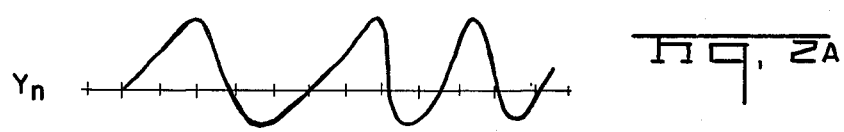
FIGS. 2A and 2B show sampling windows, the basis trace and the prediction trace respectively.
Figure 2B:
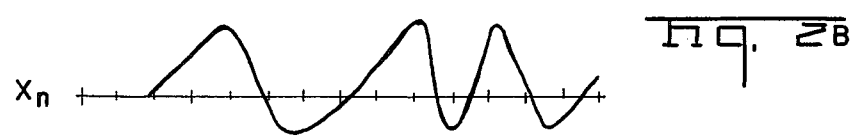

In FIG. 3 the field seismograms are recorded on magnetic tape which is designated 17. The pairs of contiguous traces are selected as indicated at 18. A sampling window is selected as indicated at 19 and 20 respectively. These windows are designated $y_n$ and $x_n$ respectively where the index n designates the number of samples in the window. For example, in FIG. 1 the window $y_n$ may extend from the time 21 to the time 22 and the window $x_n$ may extend from the time 23 to the time 24. These sampling windows are depicted in FIGS. 2A and 2B respectively. Twelve sampling intervals are indicated in each window, i.e. n=12. The number may be larger in practice.

The basis trace window is autocorrelated as indicated at 25 in FIG. 3 and this window is cross correlated with the window from the prediction trace as indicated at 26. The autocorrelation function and the cross-correlation functions are designated $r_j$ and $g_m$ respectively where j and m are indexes of the digital samples in each function. From the autocorrelation function and the cross-correlation function, the operator of a time domain filter which correlates the coherent noise in the windows of the basis trace and the prediction trace can be determined. The filter operator selector is indicated at 27 in FIG. 3. The filter selector 27 may be a modification of the inverse filter selector 22 in U.S. Pat. No. 3,689,874, Foster, et al. where $\delta_j$ in Columns 13 and 14 are specific numbers whereas the $g_m$ of this invention are computed numbers. This filter selector determines the coefficients $f_i$ of a time domain filter. The filter coefficients are selected to produce the least squared error between the cross-correlation function and the autocorrelation function multiplied by the filter coefficients. These are used in the filter 28 which filters the basis trace to produce an estimate of the coherent noise, which estimate is designated $x_n$. This estimate is subtracted from the prediction trace to remove the coherent noise. The coherent noise removal is indicated at 29 in FIG. 3. The output is a trace from which the coherent noise has been removed without adversely affecting reflections which may occur at the same time.

The process is repeated for successive contiguous pairs of traces. In this manner, the coherent noise is removed from each of the traces without obscuring the reflections in the trace.

In many cases, the moveout of the coherent noise is known and the start time of each window select, 19 or 20, can be specified. However, in accordance with an alternative embodiment of the invention the start times of each of the windows are automatically selected.

This is accomplished by cross-correlating the window of the basis trace with the prediction trace through all sampling intervals in which the coherent noise may appear on the prediction trace. Then, the filter coefficients are determined for different windows starting at different successive sampling intervals. The filter which produces the least squared error is selected and from this filter, the starting time of the window on the prediction trace is determined.

Figure 2C:
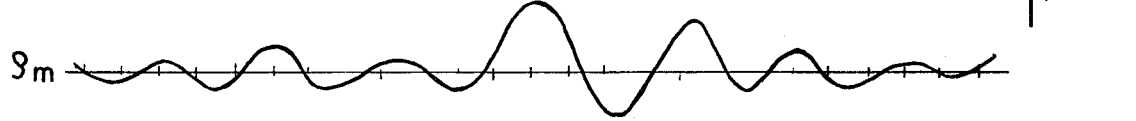
FIG. 2C shows a cross-correlation function.
Figure 4:
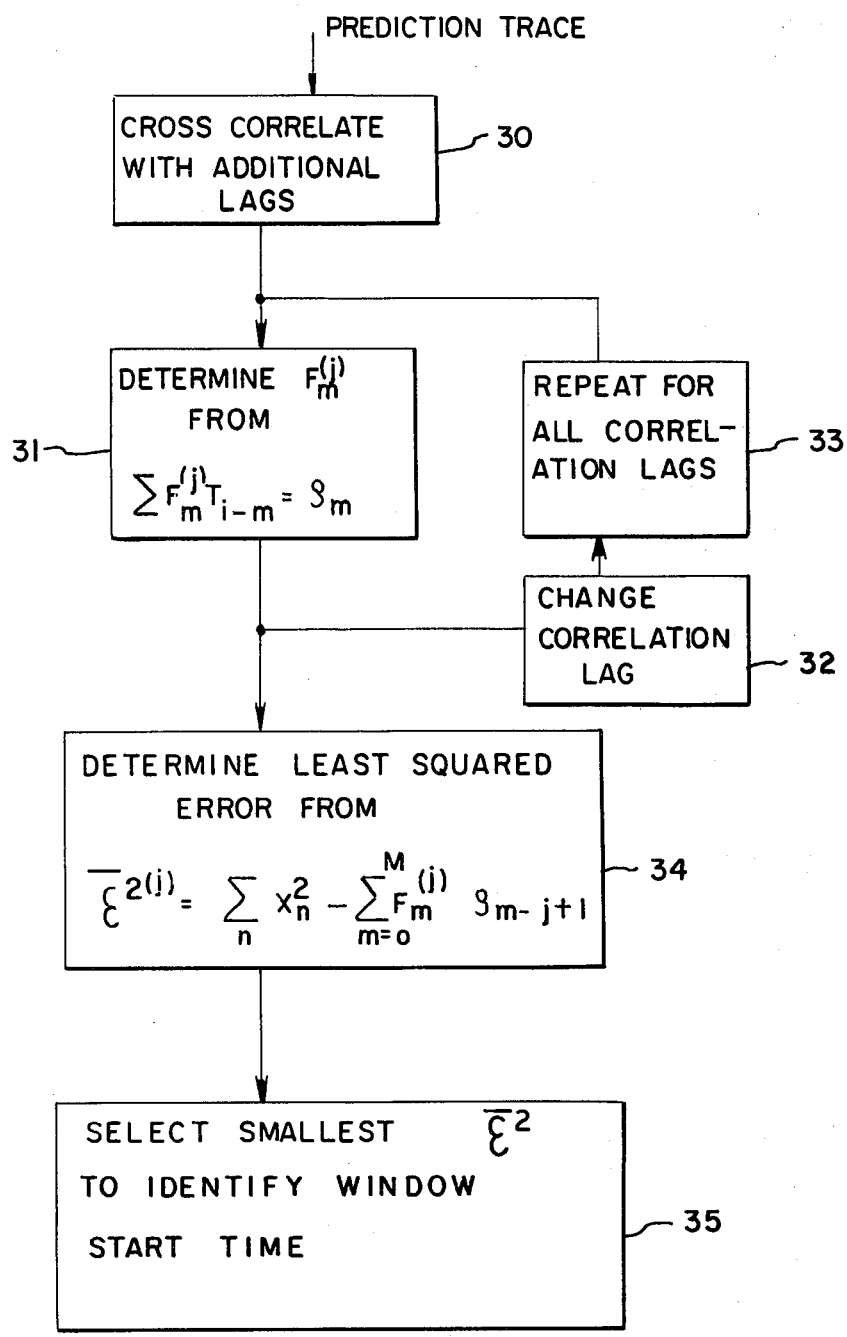
FIG. 4 is a flow sheet depicting the modification in which the sampling windows are automatically selected.

This is shown in FIG. 4 wherein the window of the basis trace $x_n$ is cross-correlated with the prediction trace through all sampling intervals on the prediction trace wherein the coherent noise may appear. This cross correlation is indicated at 30 in FIG. 4. For example, referring to FIG. 2C, only 12 samples, or lags, are required to determine the filter coefficients. However, FIG. 2C shows an autocorrelation with 25 lags. These are used 12 at a time to determine the filter coefficients $f_i$.

Referring back to FIG. 4, the step of determining the filter coefficients is indicated at 31. The coefficients are determined j times. Each time the correlation lag is changed as indicated at 32 and this is repeated for all lags as indicated at 33.

For each lag the least squared error is determined as indicated at 34. The minimum least squared error identifies the correct window start time on the prediction trace as indicated at 35.

THEORY

The foregoing can be better understood from the following description of the underlying theory. For convenience to those skilled in geophysical processing, a precise mathematical description is given below. It will be understood that while mathematical expressions are used to precisely define the various steps of the invention, these steps are physical steps which are performed on a digital processor or other apparatus commonly used in seismic processing. The terms "selecting," "determining," "filtering," "removing" "autocorrelating," "cross-correlating," "signal" and "function" as used herein mean the operations and signals generated in and performed in this apparatus. $x_n$ is the sampling window from the trace to be predicted, PTRACE, and $y_n$ is the design window from the basis trace, BTRACE. The invention determines the filter operator $f_i$ which best predicts $x_n$ from $y_n$. The least squared criterion is used, so that the estimate of $x_n$, $\hat{x}_n$, may be written $$\hat{x}_n = \sum_{i=o}^{M} f_i y_{n-i}$$

$\hat{x}_n$ should differ from the actual value of $x_n$ by $\epsilon_n$ $$\epsilon_n = x_n - \hat{x}_n$$

and the operator $f_i$ is determined such that the mean squared value of $\epsilon_n$ is a minimum. Thus $$\bar{\epsilon^2} = \sum_n \epsilon_n^2 = \sum_n \left( x_n - \sum_i f_i y_{n-i} \right)^2$$

Differentiation with respect to $f_m$ gives the normal expressions for $f_i$ $$\sum_i f_i \sum y_{n-i} y_{n-m} = \sum_n x_n y_{n-m}$$

If we denote the auto correlation of $y_n$ by $r_j$ $$r_j = \Sigma y_n y_{n+j}$$

and the cross correlation of $x_n$ and $y_{n-m}$ by $g_m$ $$g_m = \sum_n x_n y_{n-m}$$

we obtain $$\sum_{i=1}^{M} f_i r_{m-i} = g_m$$

The foregoing specifies a set of simultaneous equations which can be solved by the procedure described for example, as Subroutine EUREKA on p. 44 of Robinson *Multichannel Time Series Analysis with Digital Computer Programs,* Holden-Day, 1967. Alternatively, as mentioned above, if the $\delta_j$ in equation 22 or 24 of the Foster, et al. patent is replaced by $g_m$ above, then the equations are the same and the $a_j$ in the Foster, et al. patent would be the same as the $f_i$ here.

If an automatic search for the windows is required, the search can be implemented by using the Simpson sideways recursion procedure one example of which is Subroutine SIDE on p. 80 of the aforementioned Robinson book. This permits the determination of the filter operator for the case where the right hand side of the foregoing equation changes by one time shift and the filter for the current time shift is known. The automatic window select is implemented in the same manner as the determination of the filters depicted in FIG. 1 and iterating this procedure one shift at a time. If the cross correlation, $g_m$, is computed for $m = -k$ to M rather than just from 0 to M, where $k+1$ positions are searched, the proper information for determining enough filters to obtain the optimum start time is available. If the lags of $g_m$ are $m = -k, \ldots, M$ the solution for $f^{(1)}_i$ is:

$$\sum_i f^{(1)}_i r_{i-m} = g_m \text{ for } m = 0, \ldots, M,$$

$f^{(1)}_i$ can be used to obtain $f^{(2)}_i$ which is the solution to $$\sum_i f^{(2)}_i r_{i-m+1} = g_m \; m = 1, 0, \ldots, M - 1$$

and so forth up to $f^{(k+1)}_i$ $$\sum_i f^{(k+1)}_i r_{i-m+k} = g_m \; m = -k, \ldots, M - k$$

This can be done with the Simpson subroutine referred to previously. For each filter the value of the expected error is computed.

$$\bar{\epsilon}^2(j) = \sum_n x_n^2 - \sum_{m=0}^{M} f^{(j)}_m g_{m-j+1}$$

The value of j for which $\bar{\epsilon}^2(j)$ is the smallest gives the optimum window start time as follows.

Opt. Start Time = Start Time Used on $y_n - (j - 1)*$THETA

Using this start time, the auto and cross-correlations $r_j$ and $g_m$ are recomputed and the filter is determined. This recomputation insures that the same windowing effects are present for all filters.

Once the proper filter has been computed, the window shift time must be determined. This is merely the difference in start times between the x and y trace windows. The time shift is therefore:

Start Time on Trace x − Start Time on Trace y where the start time on trace y may be different from the input value if an automatic search was requested. The time shift may be converted to a shift in samples by dividing the time shift by THETA, and will be denoted y $\zeta$.

The filter operator, $f_i$, is convolved with trace $y_n$ from which the window $y_n$ was selected to produce an output trace $z_n$.

$$z_n = \sum_{i=0}^{M} f_i y_{n-i}$$

This output trace is subtracted from trace $x_n$, from which the window $x_n$ was selected, with a shift $\zeta$. The output of this subtraction is the desired deconvolved output, $d_n$.

$$d_n = x'_{n-\zeta} - z_n$$

$$d_n = x'_{n-\zeta} - \Sigma f_i y_{n-i}$$

Note that depending on the sign of $\zeta$, the front or back part of $d_n$ may have to be padded with zeros to obtain a length TTIR. As a rule, $d_n$ will be set to zero if there is no $x'_{n-\zeta}$ value for the particular n.

The suggested parameterization for implementation of the invention:

1. LENP—Prediction operator length in MS.
2. MODESEL—Trace selection mode. If MODESEL=0, the specification numbers are trace numbers, if MODESEL=1, the specification numbers are trace distances.
3. PTRACE—A set of numbers giving the trace numbers or distances of the traces being predicted. If trace numbers are required, there will be NBTRA values. If distances are required, there may be more than NBTRA values.
4. BTRACE—A set of numbers giving the trace numbers or distances of the basis traces used to predict the output. The PTRACE and BTRACE numbers will be used in pairs. PTRACE(k) will be used to predict BTRACE(k) and the pair used to compute the output trace.
5. LDESW—Length of operator design window in MS.
6. STP—A set of NBTRA numbers giving the start times of the design window for each PTRACE, the trace being predicted.
7. STB—A set of NBTRA numbers giving the start time of the design window for each BTRACE, the basis trace.
9. MODEWIN—Window search mode=0, no search. Use parameters 6 and 7 to computer filter directly. =1, automatic search over specified range to obtain optimum filter.
10. SRANGE—Window search range, MS. Required if MODEWIN=1. An automatic search for the optimum filter position will be done using a fixed start time on PTRACE given by STP(k), and a range of start times on the basis trace going from STB(k) to STB(k)−SRANGE+THETA for a total of SRANGE/THETA positions.

Other parameters required are: the sample interval, THETA; the number of traces per record, NBTRA; and the trace length TTIR.

One example of a computer system which is suitable for use is supplied by Control Data Corporation and includes a Cyber 175 central processor with one or more peripheral processors, extended core storage and tape drives. The specific programming required will be apparent from the foregoing, from the user's manuals for the particular computer system used, and from Simpson: TIME-SERIES COMPUTATIONS IN FORTRAN AND FAP, Addison Wesley, Reading, Mass., 1966; and, Robinson, MULTI-CHANNEL TIME SERIES ANALYSIS WITH DIGITAL COMPUTER PROGRAMS, Holden-Day, San Francisco, 1967.

While a particular embodiment has been shown and described, modifications are within the true spirit and scope of the invention. The appended claims, are therefore, intended to cover all such modifications.

I claim:

1. In seismic exploration wherein sets of seismic traces represent the reflections of seismic energy detected at locations along a line of exploration, the method of filtering coherent noise which has a different moveout from trace to trace than said reflections comprising:
   selecting sampling windows from a pair of contiguous traces in said set, one being a basis trace and the other a prediction trace;
   determining the coefficients of a digital filter which correlates the coherent noise in the window of said basis trace with the coherent noise in the window of said prediction trace;
   filtering said basis trace with said digital filter to produce an estimate of said coherent noise;
   removing said estimate of said coherent noise from said prediction trace; and
   repeating all of the foregoing steps for other pairs of contiguous traces in said set to remove said coherent noise from said traces.

2. The method recited in claim 1 wherein the step of determining the coefficients of a filter comprises:
   autocorrelating the window of the basis trace;
   cross-correlating the window of said basis trace with the window of said prediction trace; and
   selecting the coefficients which produce the least error between the cross-correlation function and the product of the autocorrelation function and the coefficients.

3. The method recited in claim 1 wherein the step of selecting the window from said prediction trace comprises:
   cross-correlating the window of said basis trace with said prediction trace through all sampling intervals in which said coherent noise may appear;
   determining the coefficients of a digital filter which correlates the coherent noise in said window of said basis trace with the coherent noise in a window of said prediction trace;
   determining the least squared error between the coherent noise in said basis trace and the noise predicted from said filter coefficients;
   repeating the foregoing two steps for different sampling windows of said prediction trace through all of said sampling intervals; and
   selecting the minimum least squared error to identify the sampling window to be selected for said prediction trace.

* * * * *